United States Patent
Lux et al.

[19]

[11] Patent Number: 5,947,542
[45] Date of Patent: Sep. 7, 1999

[54] VEHICLE SEAT ASSEMBLY WITH COLLAPSIBLE RISER

[75] Inventors: Donald A. Lux, Trollhättan; Andrew J. Massara, Vargö n, both of Sweden; Marcel C. Ban, Troy; Alan Sturt, West Bloomfield, both of Mich.

[73] Assignee: Lear Corporation, Southfield, Mich.

[21] Appl. No.: 08/948,346

[22] Filed: Oct. 9, 1997

[51] Int. Cl.$^6$ .................................................. B60N 2/32
[52] U.S. Cl. ................... 296/65.03; 297/440.22
[58] Field of Search .................. 296/65.03, 63; 297/440.1, 440.15, 440.22

[56] References Cited

U.S. PATENT DOCUMENTS

| | | |
|---|---|---|
| 3,151,906 | 10/1964 | Roberts . |
| 3,746,389 | 7/1973 | Fourrey . |
| 4,341,415 | 7/1982 | Braun et al. . |
| 4,708,387 | 11/1987 | Yamano et al. ............................ 296/63 |
| 4,946,216 | 8/1990 | Demick ....................................... 296/63 |
| 5,116,097 | 5/1992 | Bulgari . |
| 5,482,346 | 1/1996 | Lesourd . |
| 5,492,386 | 2/1996 | Callum . |
| 5,527,087 | 6/1996 | Takeda et al. . |
| 5,611,589 | 3/1997 | Fujii et al. . |
| 5,662,367 | 9/1997 | Rastetter et al. ....................... 296/65.03 |

*Primary Examiner*—Joseph D. Pape
*Attorney, Agent, or Firm*—Brooks & Kushman P.C.

[57] ABSTRACT

A vehicle seat assembly includes a one-piece base adapted for mounting in a vehicle floor recess. First and second riser legs are pivotally attached to the base and include attachment features. Each riser leg is pivotable between upright and collapsed positions. A seat frame is removably connected to the attachment features. The riser legs are pivotally collapsible against the base to increase vehicle storage capacity when the seat frame is removed from the riser legs. The direct attachment of the riser legs to the one-piece base provides accurate location of the attachment features for attachment of the seat frame.

14 Claims, 5 Drawing Sheets

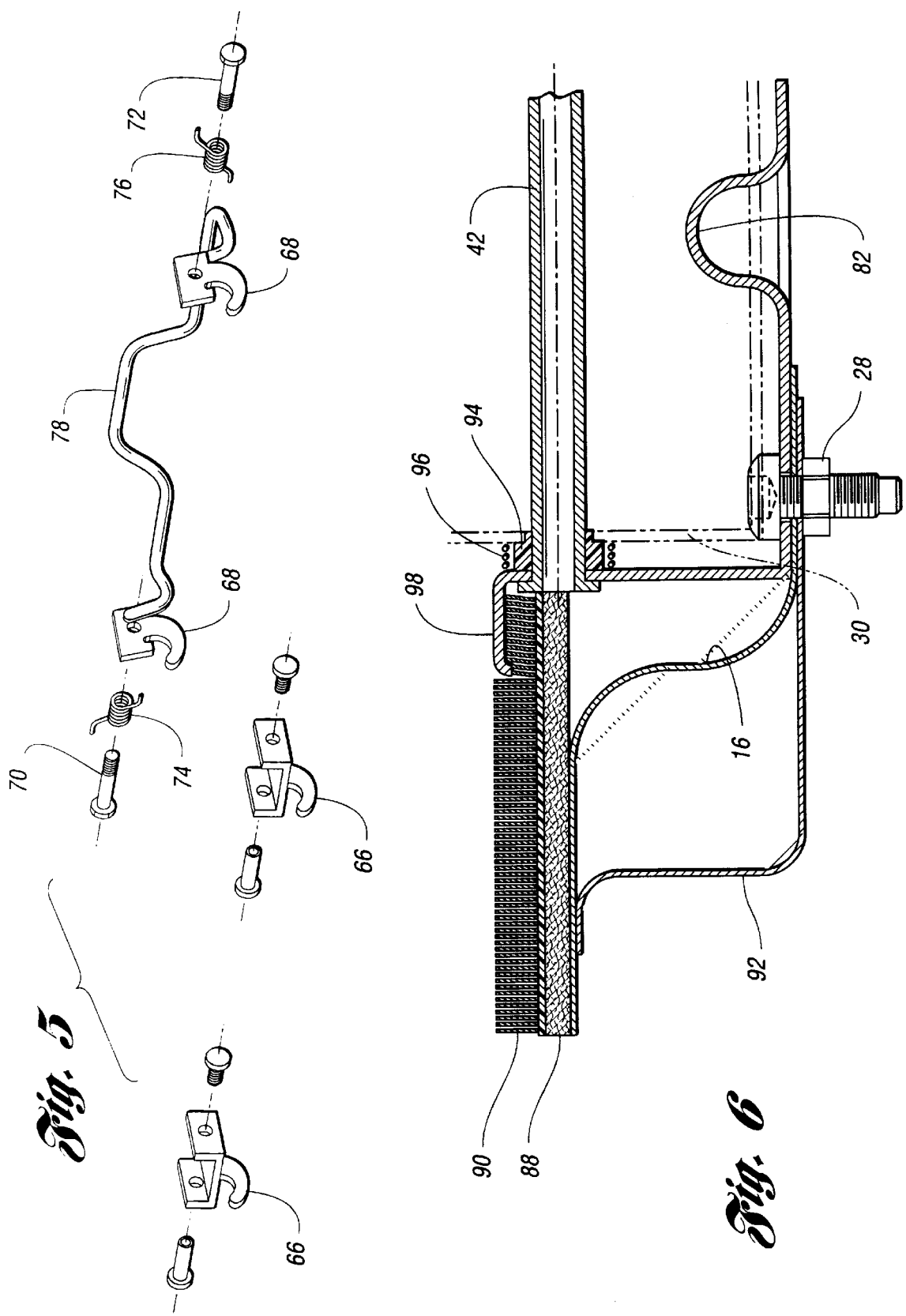

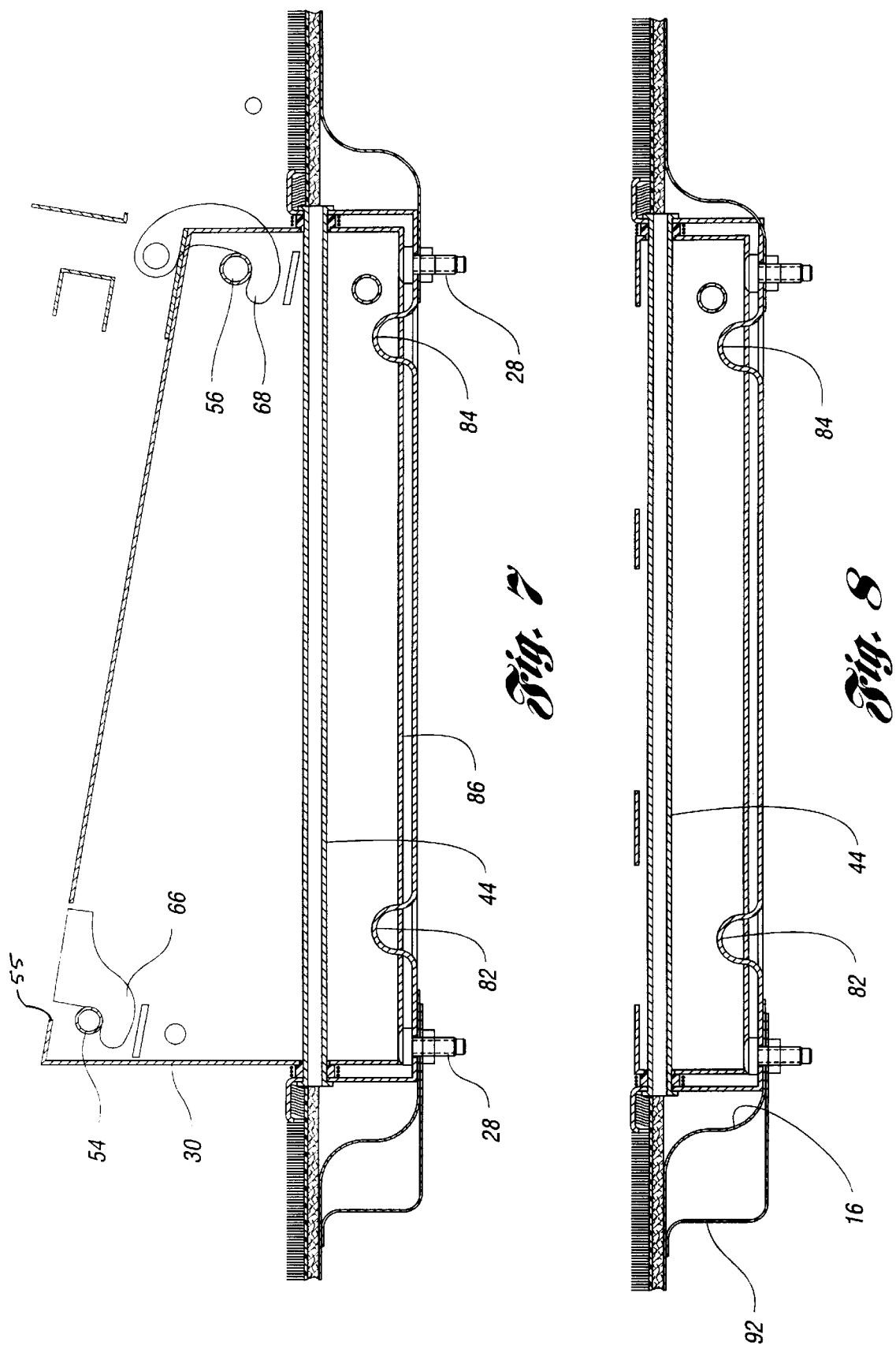

VEHICLE SEAT ASSEMBLY WITH COLLAPSIBLE RISER

TECHNICAL FIELD

The present invention relates to a collapsible riser for a removable vehicle seat, and more particularly to a collapsible riser in which both riser legs are connected directly to a single piece base for accurate location of seat attachment features.

BACKGROUND OF THE INVENTION

Large automotive vehicles, including station wagons, vans, passenger trucks, utility and recreational vehicles, are often purchased for their carrying capacity. This carrying capacity includes not only the transportation of passengers, but also the transportation of various sizes and amounts of cargo. For this reason, most, if not all, of these vehicles come with some type of removable or stow-away seat.

Typically, the removable seat assemblies of these vehicles are of the self-standing type. Accordingly, each seat assembly has its own set of frame-mounted legs or risers. Once the seat assembly is positioned inside the vehicle, the frame-mounted risers are bolted or attached to the floor of the vehicle.

The frame-mounted risers do not interfere with either the driver or the passenger once secured in the vehicle, but they do present significant size and weight limitations.

Typically, frame-mounted risers have a height variance of 8 to 14 inches. The increased height is advantageous in that it promotes passenger comfort and visibility. However, this increase in assembly height may present problems, predominantly during the installation and removal of the seat assembly in the limited confines of the vehicles cargo area. The protruding riser hooks or attachment points may scratch floors, doors, doorwells, and sometimes even the legs of the person handling the assembly.

A second limitation of frame-mounted risers is the resulting weight increase to the seat assembly itself, which adds difficulty in handling the removed seat assembly. This difficulty is compounded by the fact that the person removing the seat must usually do so while in a bent over position due to the limited confines of the vehicle's cargo area.

U.S. Pat. No. 4,946,216 attempted to solve the problems associated with a frame-mounted riser by mounting each seat riser at separate locations for each side of a seat within the floor of a vehicle. However, a significant problem with such an arrangement is that the stack-up of tolerances between the risers, their support structure, and the vehicle floor may result in a substantial variation in the location of the seat attachment features on the riser. Such variation of attachment feature location resulting from stack-up of tolerances of the various components may cause significant problems in assembling the seat onto the risers.

Accordingly, it is desirable to provide a collapsible riser assembly for each seat in which the problem associated with stack-up tolerances for seat attachment features is alleviated, and in which weight is reduced from the removable seat.

DISCLOSURE OF THE INVENTION

The present invention overcomes the above-referenced shortcomings of prior art seat assemblies by providing a removable seat assembly which is attachable to a collapsible seat riser assembly, wherein both riser members are pivotally connected to a single base in order to minimize location variation of seat attachment features on the riser.

More specifically, the present invention provides a vehicle seat assembly including a one-piece base adapted for mounting in a vehicle, and first and second riser legs pivotally attached to the base. Each riser leg includes attachment features thereon. Each riser leg is also pivotable between upright and collapsed positions. A seat frame is removably connected to the attachment features. The riser legs are pivotally collapsible against the base to increase vehicle storage capacity when the seat frame is removed from the riser legs, and the direct attachment of the risers to the one-piece base provides accurate location of the attachment features for attachment of the seat frame.

Preferably, the one-piece base is mounted in a recess on the vehicle floor. The base preferably comprises a pan configured to substantially enclose the riser legs when in the collapsed position. The assembly also includes a latch connected to the base for latching the riser legs in the collapsed position.

Accordingly, an object of the present invention is to provide a collapsible vehicle seat riser assembly in which both riser members are connected directly to a one-piece base in order to minimize variation of attachment feature location on the riser members.

A further object of the present invention is to provide a seat assembly including a collapsible riser which reduces weight of the removable seat assembly by remaining attached to the floor and disconnected from the removable seat assembly.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 5 shows an exploded perspective view of a latch hook assembly for attaching the seat to the riser as shown in FIG. 4;

FIG. 6 shows vertical cross-sectional view of a seat riser assembly secured in a vehicle in accordance with the present invention;

FIG. 7 shows a vertical cross-sectional view of a seat riser assembly secured in a vehicle with the riser leg in the upright position in accordance with the detail shown in FIG. 6; and FIG. 8 shows a vertical cross-sectional view of a seat riser assembly secured in a vehicle in accordance with the present invention with the riser leg in the collapsed position.

DETAILED DESCRIPTION OF THE PREFERRED EMBODIMENT

Figure 1:
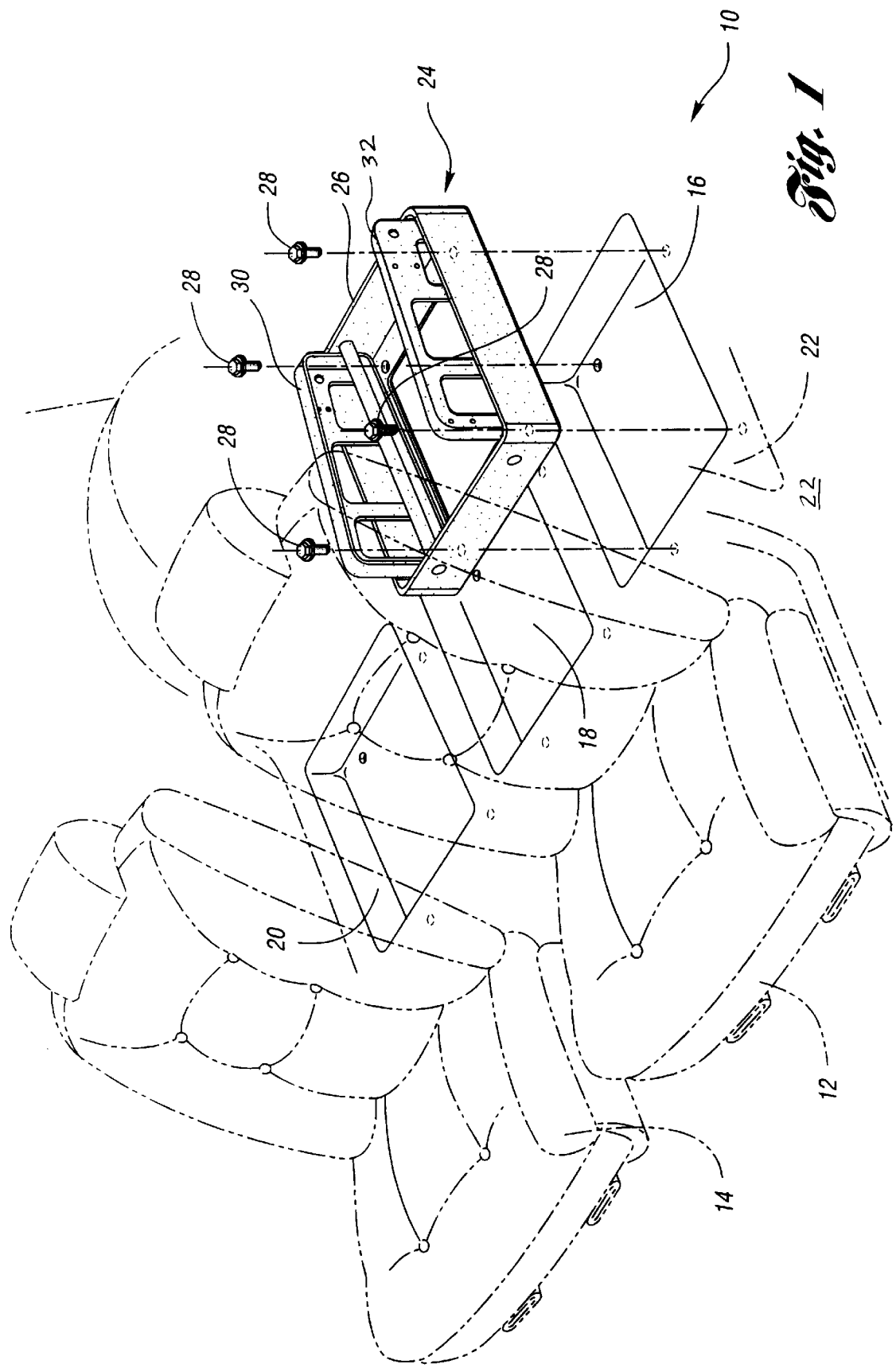
FIG. 1 shows a partially exploded, schematically arranged perspective view of a vehicle seat riser assembly secured in a vehicle in accordance with the present invention.

Referring to FIG. 1, a vehicle passenger compartment 10 is shown to include front seats 12,14, and a plurality of recesses 16,18,20 formed in the vehicle floor 22. Each recess 16,18,20 is adapted to receive a collapsible riser assembly 24.

The collapsible riser assembly 24 includes a one-piece pan or base 26 which is secured within the recess 16 by bolts 28. Preferably, the floor recesses 16,18,20 are approximately 70 millimeters deep in order to enclose the collapsed riser assembly 24 when the riser legs 30,32 are collapsed within the pan 26.

Figure 2:
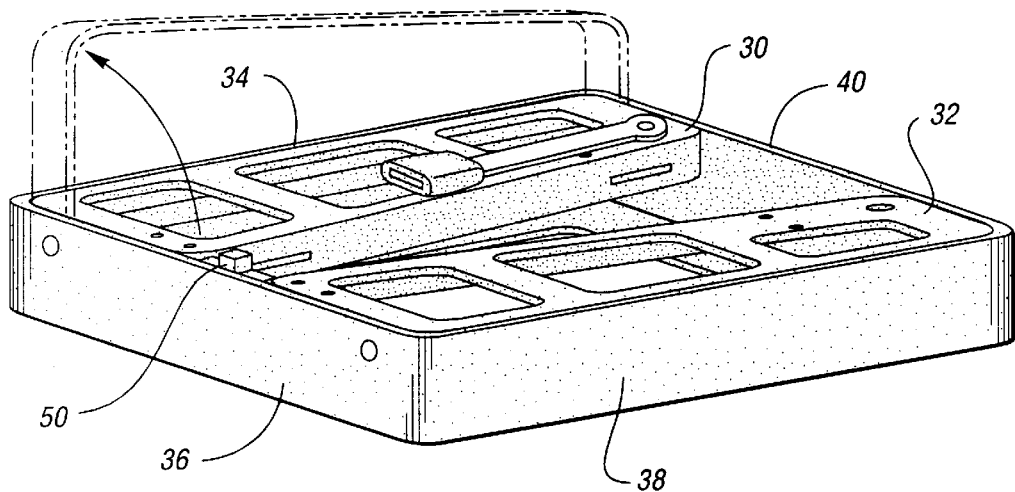
FIG. 2 shows a perspective view of the seat riser assembly of FIG. 1 with the riser legs in the collapsed position.
Figure 3:
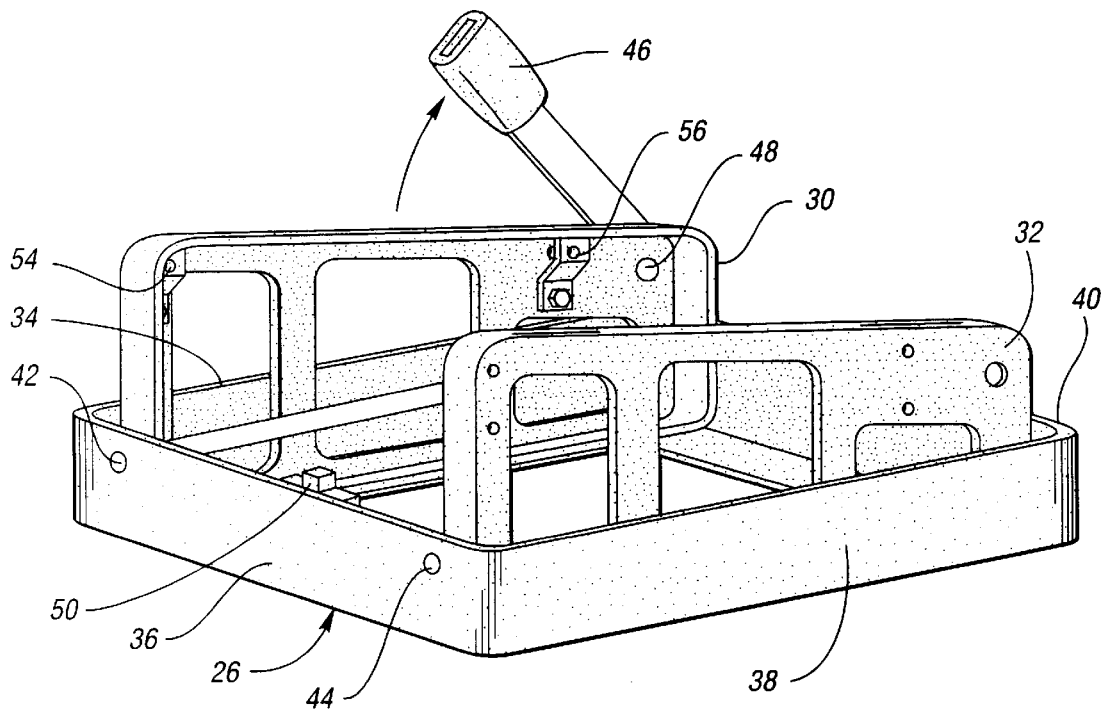
FIG. 3 shows a perspective view of the seat riser assembly of FIG. 1 with the riser legs in the upright position.

As shown in FIGS. 2 and 3, the one-piece base 26 is configured as a pan with side walls 34, 36, 38, 40. The riser legs 30,32 are pivotally connected to the base 26 by the pivot tubes 42,44 for facilitating pivotal movement between the collapsed position shown in FIG. 2 and the upright position shown in FIG. 3. With the riser legs 30,32 in the collapsed position shown in FIG. 2, vehicle storage capacity is increased in the passenger compartment 10.

As further illustrated in FIGS. 2 and 3, a seat belt latch 46 is pivotally mounted to the riser leg 30 at the pivot joint 48 for pivotal movement between the collapsed position shown in FIG. 2 and the extended position shown in FIG. 3. By mounting the seat belt latch 46 directly to the seat riser leg 30, weight is reduced from the removable seat assembly which eases handling of the removed seat assembly.

As also illustrated in FIGS. 2 and 3, a latch 50 is also provided on the base 26 for selectively latching the riser legs 30,32 in the collapsed position. Preferably, the riser legs 30,32 are spring-biased toward the upright position, and automatically move to the upright position as a result of the spring bias when the latch 50 is operated to release the riser legs 30,32 from the collapsed position.

Figure 4:
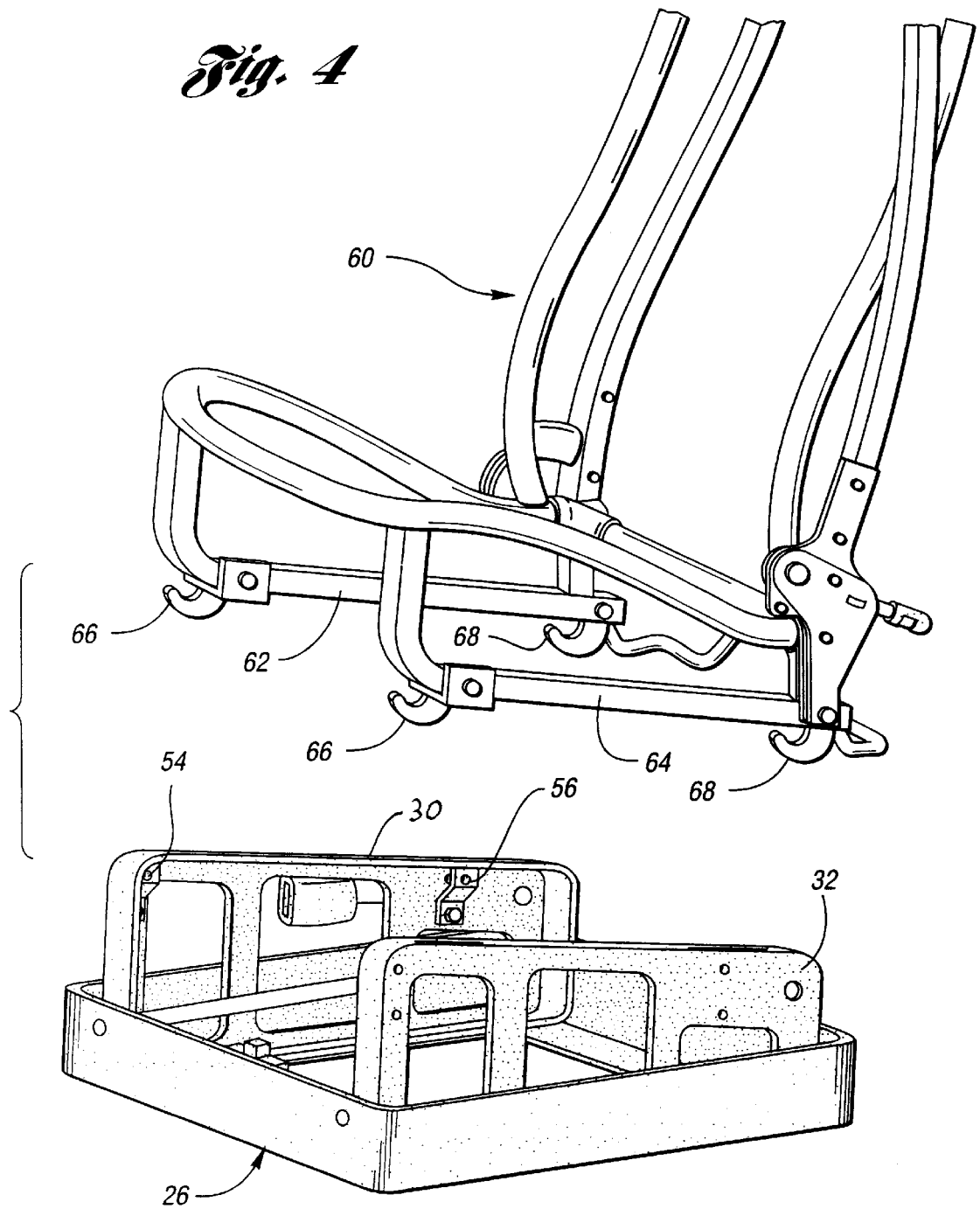
FIG. 4 shows a partially exploded perspective view of a vehicle seat assembly in accordance with the present invention.

As shown in FIG. 3, and more clearly understood with reference to FIGS. 4, 5 and 7, attachment features 54,56 are mounted on the riser legs 30,32 for attachment of the removable seat. By connecting the riser legs 30,32 directly to the one-piece base 26, location of the attachment features 54,56 is not subject to a stack-up of tolerances of numerous components, therefore the attachment features 54,56 may be repeatably, accurately located for receiving the removable seat.

As shown in FIG. 4, the removable seat 60 preferably comprises a number of aluminum tubes or other lightweight structure which form a back frame and lower seat frame, including tubes 62,64. The tubes are lightweight, which reduces weight of the assembly. Attachment hooks 66,68 are secured to the tubes 62,64 for engagement with the attachment features 54,56 on the risers 30,32. As shown in FIGS. 4 and 5, the rear hooks 68 are pivotally connected to the seat 60 by the pins 70,72. Torsional springs 74,76 pivotally bias the hooks 68 toward a latched position about the attachment features 56, and a handle 78 is provided for disengaging the rear hooks 68 from the attachment features 56 against the bias of the torsional springs 74,76. Attachment of the hooks 66,68 to the attachment features 54,56 is more clearly shown in FIG. 7. As shown, attachment feature 54 is engaged by hook 66, which extends through the slot 55, and attachment feature 56 is engaged by pivotable hook 68. Also, the seat 60 is easily removed by operating the handle 78 to disengage the hooks 68.

Stop beads 82,84 formed in the bottom of the base 26, as shown in FIG. 7, are configured to limit the travel of the riser legs 30,32 to the upright position by abutting the bottom edge 86 of the riser legs 30,32.

FIGS. 6, 7 and 8 illustrate the recess 16 formed in the vehicle floor, as well as the insulator 88 and carpet 90. A cross-car floor reinforcement 92 may also be provided for adding structural integrity to the vehicle floor. FIG. 6 also illustrates the mounting of the pivot tube 42 on a bushing 94, and further illustrates the torsional spring 96 which pivotally biases the riser legs 30 toward the upright position. A flange 98 is provided along the edge of the riser assembly for covering the edge of the carpet 90.

Accordingly, the present invention achieves the stated objects of a collapsible riser and lightweight removable seat, wherein tolerance stack-up effect on attachment features is minimized. Also, by building the seat support angle into the riser legs 30,32, further structural weight is reduced from the removable seat 60.

While the best mode for carrying out the invention has been described in detail, those familiar with the art to which this invention relates will recognize various alternative designs and embodiments for practicing the invention within the scope of the appended claims.

What is claimed is:

1. A vehicle seat assembly, comprising:
   a one-piece base adapted for mounting in a vehicle;
   first and second riser legs pivotally attached to the base and including attachment features, each riser leg being pivotable between upright and collapsed positions; and
   a seat frame removably connected to the attachment features;
   wherein the riser legs are pivotally collapsible against the base to increase vehicle storage capacity when the seat frame is removed from the riser legs, and wherein the direct attachment of the riser legs to the one-piece base minimizes variations in location of the attachment features for attachment of the seat frame.

2. The vehicle seat assembly of claim 1, wherein said base comprises a pan configured to substantially enclose said riser legs when in the collapsed position.

3. The vehicle seat assembly of claim 1, further comprising a latch connected to the base for latching the riser legs in the collapsed position.

4. The vehicle seat assembly of claim 1, further comprising:
   at least two latch pins connected to the riser legs; and
   at least two pivotable latch hooks extending from the seat frame for removable attachment to the latch pins.

5. The vehicle seat assembly of claim 4, wherein said at least two pivotable latch hooks are spring-biased with respect to the seat frame, and include a latch handle connected to the latch hooks.

6. The vehicle seat assembly of claim 1, further comprising a seat belt latch pivotally connected to one of said riser legs.

7. The vehicle seat assembly of claim 1, wherein said base includes at least one stop bead for limiting the travel of the riser legs in the upright position.

8. A vehicle seat assembly, comprising:
   a vehicle floor having a recess formed therein;
   a one-piece base adapted for mounting in the recess;
   first and second riser legs pivotally attached to the base and including attachment features, each riser leg being pivotable between upright and collapsed positions;
   a seat frame removably connected to the attachment features;
   wherein the riser legs are pivotally collapsible against the base to increase vehicle storage capacity when the seat frame is removed from the riser legs, and wherein the direct attachment of the riser legs to the one-piece base minimizes variations in location of the attachment features for attachment of the seat frame; and
   a seat belt latch pivotally connected to one of said riser legs.

9. The vehicle seat assembly of claim 8, wherein said base comprises a pan configured to substantially enclose said riser legs when in the collapsed position.

10. The vehicle seat assembly of claim 8, further comprising a latch connected to the base for latching the riser legs in the collapsed position.

11. The vehicle seat assembly of claim 8, further comprising:

at least two latch pins connected to the riser legs; and at least two pivotable latch hooks extending from the seat frame for removable attachment to the latch pins.

12. The vehicle seat assembly of claim 9, wherein said at least two pivotably latch hooks are spring-biased with respect to the seat frame, and include a latch handle connected to the latch hooks.

13. The vehicle seat assembly of claim 8, wherein said base includes at least one stop bead for holding the riser legs in the upright position.

14. A vehicle seat assembly, comprising:

a one piece base adapted for mounting in a vehicle;

first and second riser legs pivotally connected to the base, each riser leg being pivotable between upright and collapsed positions;

a seat frame removably connected to the riser legs;

wherein the riser legs are pivotally collapsible against the base to increase vehicle storage capacity when the seat frame is removed from the riser legs; and wherein said base comprises a pan configured to substantially enclose said riser legs when in the collapsed position, and wherein the direct connection of the riser legs to variations in base minimizes variations in location of the attachment features for attachment of the seat frame.

* * * * *

UNITED STATES PATENT AND TRADEMARK OFFICE
CERTIFICATE OF CORRECTION

PATENT NO : 5,947,542
DATED : September 7, 1999
INVENTOR(S) : VEHICLE SEAT ASSEMBLY WITH COLLAPSIBLE RISER It is certified that error appears in the above-identified patent and that said Letters Patent is hereby corrected as shown below:

Column 6, Line 13 (Claim 14), Delete "to variations in base" and insert --to the one-piece base--.

Signed and Sealed this

Twenty-third Day of May, 2000

*Attest:*

*Attesting Officer*

Q. TODD DICKINSON

*Director of Patents and Trademarks*